United States Patent [19]

Powers

[11] Patent Number: 4,605,952
[45] Date of Patent: Aug. 12, 1986

[54] COMPATIBLE HDTV SYSTEM EMPLOYING NONLINEAR EDGE COMPRESSION/EXPANSION FOR ASPECT RATIO CONTROL

[75] Inventor: Kerns H. Powers, Princeton, N.J.

[73] Assignee: RCA Corporation, Princeton, N.J.

[21] Appl. No.: 504,374

[22] Filed: Jun. 14, 1983

Related U.S. Application Data

[63] Continuation-in-part of Ser. No. 485,446, Apr. 14, 1983, abandoned.

[51] Int. Cl.[4] .................. H04N 11/20; H04N 11/04
[52] U.S. Cl. ........................................ 358/13; 358/12
[58] Field of Search .............. 358/13, 12, 1, 96, 141, 358/225, 11, 909

[56] References Cited

U.S. PATENT DOCUMENTS

| | | |
|---|---|---|
| 3,136,847 | 6/1964 | Brown . |
| 3,919,474 | 11/1975 | Benson . |
| 4,124,871 | 11/1978 | Morrin, II ............................ 358/96 |
| 4,161,000 | 7/1979 | Cleveland ........................... 358/225 |
| 4,298,888 | 11/1981 | Colles et al. ....................... 358/140 |
| 4,489,350 | 12/1984 | Kimura ............................... 358/909 |
| 4,541,016 | 9/1985 | Ochi et al. ........................... 358/228 |

OTHER PUBLICATIONS

Television Technology in the 80's, "High Definition Television Studies on Compatible Basis with Present Standard", 1981, pp. 151-165 (Wendland).

Primary Examiner—John W. Shepperd
Attorney, Agent, or Firm—P. J. Rasmussen; P. M. Emanuel; R. G. Coalter

[57] ABSTRACT

An HDTV television system is described for use in providing a compatible HDTV signal and an improved NTSC signal generated at a sample rate which conforms with the world studio standard. The system includes an HDTV camera and frame store. Two interlaced HDTV fields are stored in the HDTV frame store for further processing. The signals are supplied to two branched. In a first branch the samples from the frame store are anti-aliasing filtered, cropped and selected to generate a world-standard digital component source of an "improved" NTSC signal. In a second branch the samples from the HDTV frame store are aspect ratio compressed and scanned in a zig-zag pattern to generate an 11 MHz HDTV signal which is compatible with standard definition television receivers in use today.

8 Claims, 21 Drawing Figures

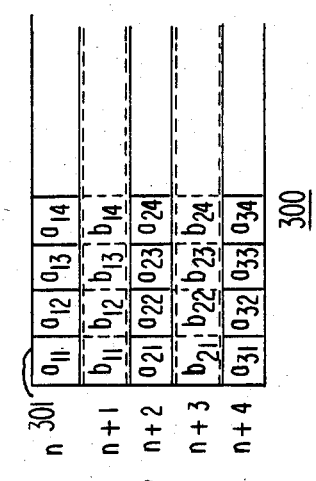
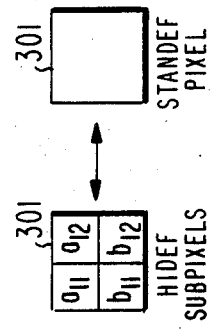
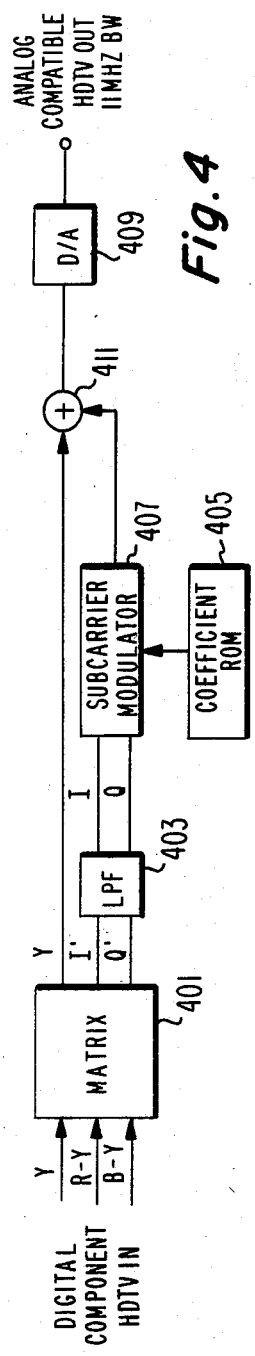

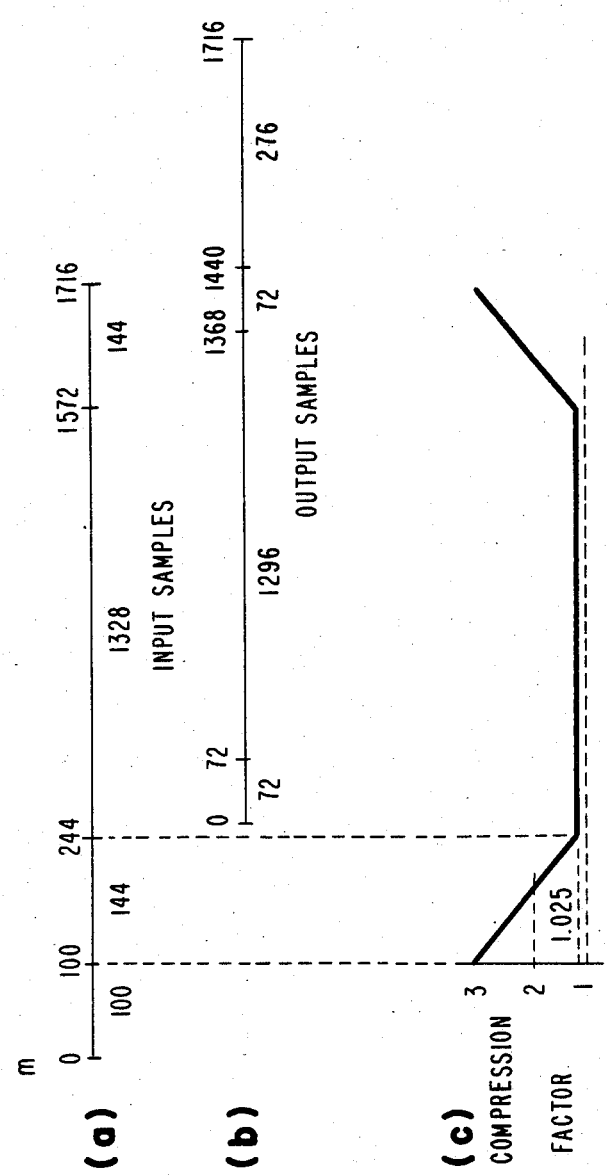

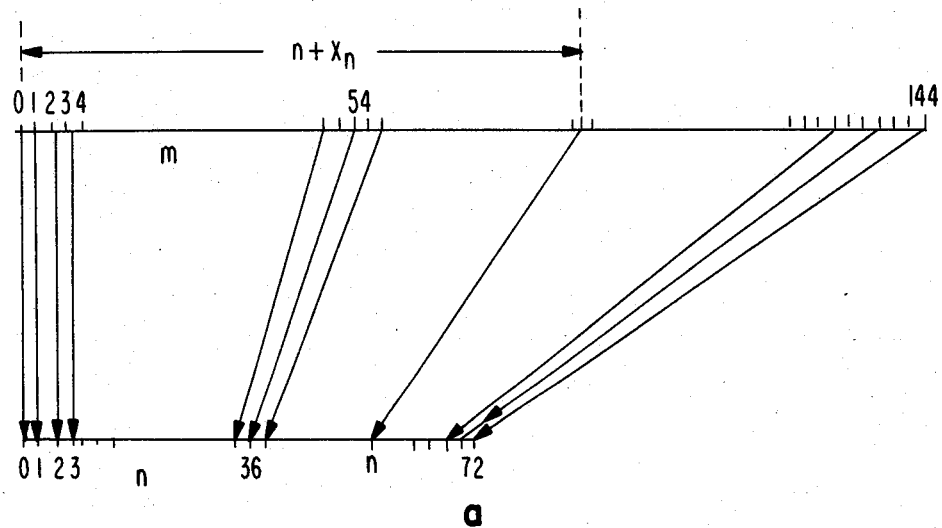
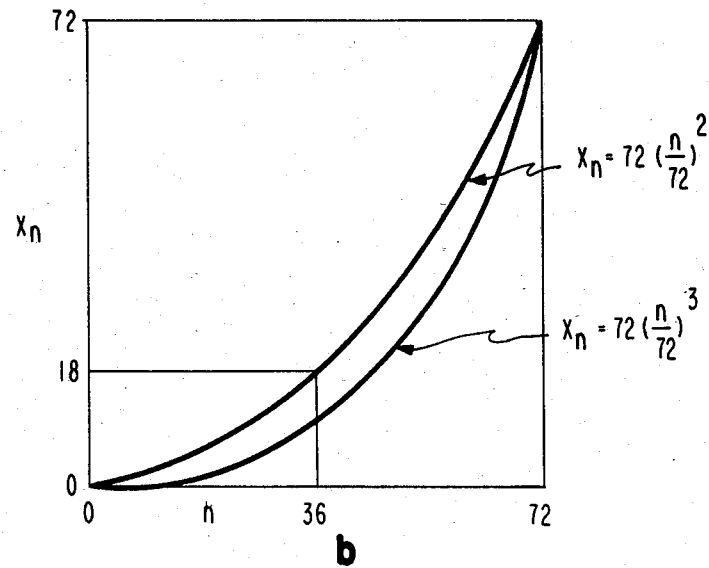
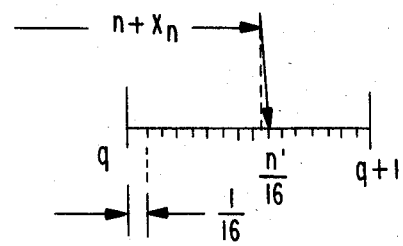
Fig.6

Table of $x_n = 72(n/72)^2$

Fig.7

| n | $x_n$ | $n + x_n$ | n' (Fraction of 16) | p. |
|---|---|---|---|---|
| 0 | 0 | 0 | 0 | 84 |
| 1 | 0.01 | 1.01388 | 0 | 86 |
| 2 | 0.05555 | 2.055555 | 1 | 89 |
| 3 | 0.125 | 3.125 | 2 | 91 |
| 4 | 0.2222 | 4.2222 | 4 | |
| 5 | 0.34722 | 5.34722 | 6 | |
| 6 | 0.5000 | 6.5000 | 8 | |
| 7 | 0.68055 | 7.68055 | 11 | |
| 8 | 0.88888 | 8.88888 | 14 | |
| 9 | 1.125 | 10.125 | 2 | |
| 10 | 1.3888 | 11.38888 | 6 | |
| 11 | 1.680555 | 12.680555 | 11 | |
| 12 | 2.0 | 14.0 | 0 | |
| 13 | 2.347222 | 15.347222 | 6 | |
| 14 | 2.72222 | 16.72222 | 12 | |
| 15 | 3.125 | 18.125 | 2 | |
| 16 | 3.5555 | 19.5555 | 9 | |
| 17 | 4.013888 | 21.013888 | 0 | |
| 18 | 4.5 | 22.500 | 8 | |
| 19 | 5.013888 | 24.01388 | 0 | |
| 20 | 5.5555 | 25.5555 | 9 | |
| 21 | 6.125 | 27.125 | 2 | |
| 22 | 6.72222 | 28.7222 | 12 | |
| 23 | 7.3472222 | 30.347222 | 6 | |
| 24 | 8.0 | 32.0 | 0 | |
| 25 | 8.680555 | 33.680555 | 11 | |
| 26 | 9.388888 | 35.388888 | 6 | |
| 27 | 10.125 | 37.125 | 2 | |
| 28 | 10.888888 | 38.88888 | 14 | |
| 29 | 11.68055 | 40.68055 | 11 | |
| 30 | 12.5 | 42.50 | 8 | |
| 31 | 13.347222 | 44.34722 | 6 | |
| 32 | 14.222222 | 46.2222 | 4 | |
| 33 | 15.125 | 48.125 | 2 | |
| 34 | 16.05555 | 50.0555 | 1 | |
| 35 | 17.013888 | 52.01388 | 0 | |
| 36 | 18.0 | 54.0 | 0 | |

Fig. 7 CONTINUED

| n | $x_n$ | $n + x_n$ | n' (Fraction of 16) | p. |
|---|---|---|---|---|
| 37 | 19.013888 | 56.013888 | 0 | |
| 38 | 20.05555 | 58.05555 | 1 | |
| 39 | 21.125 | 60.125 | 2 | |
| 40 | 22.22222 | 62.22222 | 4 | |
| 41 | 23.347222 | 64.347222 | 6 | |
| 42 | 24.500 | 66.5000 | 8 | |
| 43 | 25.680555 | 68.680555 | 11 | |
| 44 | 26.88888 | 70.88888 | 14 | |
| 45 | 28.125 | 73.125 | 2 | |
| 46 | 29.388888 | 75.3888 | 6 | |
| 47 | 30.68055 | 77.68055 | 11 | |
| 48 | 32.0 | 80.0 | 0 | |
| 49 | 33.347222 | 82.347222 | 6 | |
| 50 | 34.72222 | 84.72222 | 12 | |
| 51 | 36.125 | 87.125 | 2 | |
| 52 | 37.5555 | 89.5555 | 9 | |
| 53 | 39.013888 | 92.01388 | 0 | |
| 54 | 40.5 | 94.5 | 8 | |
| 55 | 42.013888 | 97.01388 | 0 | |
| 56 | 43.5555 | 99.5555 | 9 | |
| 57 | 45.125 | 102.125 | 2 | |
| 58 | 46.72222 | 104.7222 | 12 | |
| 59 | 48.347222 | 107.34722 | 6 | |
| 60 | 50.0 | 110.0 | 0 | |
| 61 | 51.680555 | 112.68055 | 11 | |
| 62 | 53.38888 | 115.3888 | 6 | |
| 63 | 55.125 | 118.125 | 2 | |
| 64 | 56.8888 | 120.888 | 14 | |
| 65 | 58.68055 | 123.68055 | 11 | |
| 66 | 50.500 | 126.5 | 8 | |
| 67 | 62.34722 | 129.34722 | 6 | |
| 68 | 64.2222 | 132.2222 | 4 | 239 |
| 69 | 66.125 | 135.125 | 2 | 241 |
| 70 | 68.05555 | 138.0555 | 1 | 243 |
| 71 | 70.01388 | 141.01388 | 0 | 246 |
| 72 | 72.0 | 144.0 | 0 | 248 |

THE BLACK RASTER

COMPATIBLE HDTV SYSTEM EMPLOYING NONLINEAR EDGE COMPRESSION/EXPANSION FOR ASPECT RATIO CONTROL

This application is a continuation-in-part of U.S. patent application Ser. No. 485,446 filed Apr. 14, 1983, now abandoned.

This invention relates to high definition television systems and, more particularly, to digital television systems compatible with worldwide television standards.

BACKGROUND OF THE INVENTION

It is believed that the concept of a compatible high-definition television system will be generally accepted before any radically new incompatible high-definition television service. New receiver and studio technology is on the horizon that will potentially provide for the home an even better quality NTSC display than that seen on today's television studio monitors. Certain new extended-definition systems such as MAC (multiplexed analog components) will likely be introduced soon in the United States through direct broadcast satellite. While such a system is not completely compatible, it is at least simply translatable to NTSC or RGB. In the long run, a plan must be made for the ultimate introduction of a new high definition television service that has both increased vertical resolution and wider aspect ratio. A signal format is needed for which both of these increases can be achieved compatibly with existing receivers. In accordance with the principles of the present invention a system is described that provides a signal format that achieves the aforementioned goals.

SUMMARY OF THE INVENTION

A wide-angle television system is provided which is compatible with a standard definition television system having a narrow-angle field of view. The system includes generating means for generating video samples during an active line portion of a wide-angle television horizontal line. The video samples comprise first and second portions of a scene, the first portion being representative of the active display portion of a standard definition television receiver and the second portion being representative of a part of the scene exclusive of the active display portion of the standard definition receiver, e.g., the horizontal blanking part and a part that is in the overscan region of the normal television receiver. Further, the system includes compression means for time compressing the second portion of the scene such that the number of video samples within the second portion are reduced by a factor of approximately two. A setting means is used for setting the total number of samples within the active line portion of the wide-angle television horizontal line to a value of 1440 samples. The 1440 samples are compatible with the world standard studio-equipment sample rate of 13.5 MHz.

DESCRIPTION OF THE DRAWING

In the drawing:

FIG. 3a illustrates a high definition television raster;

FIG. 3b provides a comparision of a group of high definition subpixels with a standard definition pixel;

FIGS. 3c and 3d illustrate two frames of the scanning pattern of the zigzag selector of FIG. 1 according to an aspect of the invention;

FIG. 4 illustrates in block diagram form a portion of the encoder necessary to convey the color information on a 3.58 MHz subcarrier in accordance with the invention;

FIG. 5a, is a representation of the input samples to the aspect ratio compressor; FIG. 5, is a representation of the input samples to the aspect ratio compressor.

FIG. 5b is a representation showing the output samples from the aspect ratio compressor;

FIG. 5c is a graphic representation showing the compression factor of aspect ratio compressor;

FIG. 6a is a graphical representation illustrating how the samples are interpolated from a first aspect ratio to the compressed aspect ratio;

FIG. 6b illustrates parabolic and cubic approximations for a parameter of FIG. 6;

FIG. 6c illustrates a sample interpolation technique;

FIG. 7 is a table of coefficients for interpolating new sample points in accordance with the values chosen in FIGS. 5 and 6;

FIG. 13b is a timing diagram associated with FIG. 13a.

DESCRIPTION OF THE PREFERRED EMBODIMENT

Figure 1:
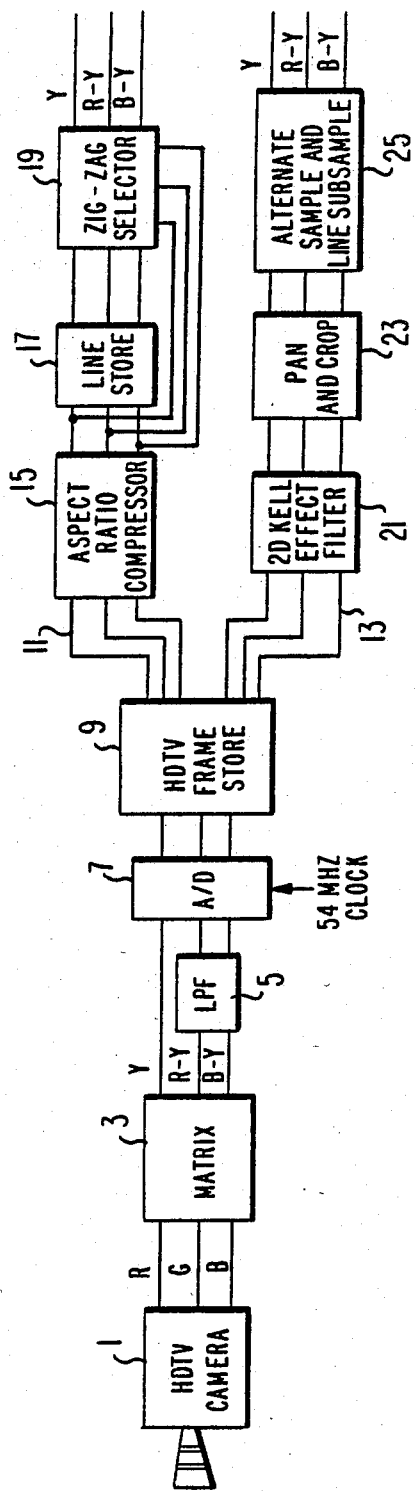
FIG. 1 illustrates in block diagram form salient portions of a high-definition video encoder arranged in accordance with the principles of the present invention.

FIG. 1 is a block diagram of a high definition television system that can be used both as a source of an "improved" NTSC signal of standard definition (i.e., a digital component system where the sampling is done at the new world studio interface standard of 13.5 MHz) and a compatible high definition television signal. High-definition television camera 1 may be a three-chip CCD imaging type camera scanned out at a line rate of twice the NTSC horizontal line frequency ($2f_H$) and at a field rate which is equivalent to the field rate of the NTSC color field rate ($f_v = 59.94$ Hz). Camera 1 provides a 1050-line image interlaced 2:1 with an aspect ratio of 5:3. In such a system the line duration would be ½(63.5556 μsec) and the increased aspect ratio is achieved by a reduced horizontal blanking interval (see FIG. 2). The red (R), green (G) and blue (B) signals are matrixed in matrix 3 in accordance with known techniques to provide luminance (Y) and chrominance components (R-Y, B-Y). The chrominance components are filtered in low pass filter 5 to a lower bandwidth in accordance with the known techniques. All three components; that is, the luminance and the two chrominance components, are sampled and quantized (digitized) at a clock rate of four times the world standard rate (i.e., 54 MHz) in analog-to-digital converter 7. The samples are then written into a high definition television frame store 9 for storage prior to further signal processing.

In general, a television studio camera is provided with one set of processing equipment represented by either branch 11 or branch 13. Branch 11, which includes blocks 15, 17 and 19, provides a compatible high definition television signal which may be transmitted in accordance with the procedure set forth herein. Branch 13, which includes blocks 21, 23 and 25 provides a digital component 525-line standard definition signal sampled at the world sample rate of 13.5 MHz. In general, a studio would be equipped with one of the two branches for providing either compatible high definition television signals or the 525-line world standard signals.

Branch 13, which provides a standard definition format will now be described. The samples which are stored in HDTV frame store 9 are filtered in a two-dimensional (planar) Kell effect filter 21. 2D Kell-effect filtering has been suggested by Broder Wendland in his paper entitled "High Definition Television Studies on Compatible Basis with Present Standards" presented as one paper of a collection of papers on television production and post production technology, presented during the 15th Annual SMPTE Television Conference in San Francisco, Calif., Feb. 6-7, 1981. Including a transcript of a panel discussion on Digital Video Component Tests performed by the SMPTE Committee on New Technology. After 2D anti-alias filtering (and vertical aperture correction), a pan and crop function is performed in block 23. The pan and crop function selects the active line of the 1440 picture samples with a center as specified by the pan-and-scan program editor. The pan and scan function may be done in a manner similar to that shown in U.S. Pat. No. 3,919,474 issued Nov. 11, 1975, on in the name of K. B. Benson. At pan and crop block 23 the full horizontal sync waveform is substituted for a reduced blanking interval as provided in camera 1 (see FIG. 2). Block 25 selects the samples to produce a standard definition signal compatible with the world studio standard. In block 25 alternate samples along a line and alternate lines in a field are gated through a FIFO buffer to $ provide the 262½ lines of each field of the 13.5 MHz studio standard.

Figure 2:
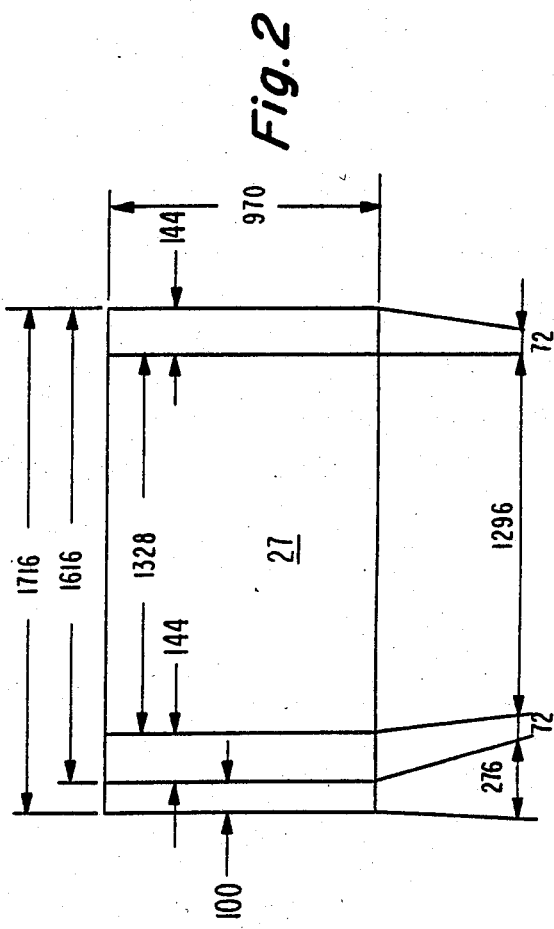
FIG. 2 is a graphical representation showing the compression of the samples provided in the aspect ratio compressor of FIG. 1 providing a compatible HDTV signal in accordance with the principles of the present invention.

For the compatible high definition output path 11, the picture samples from the frame store 9 are readout progressively in alternate line pairs and processed in the aspect-ratio compression block 15. The aspect ratio compression is illustrated in FIG. 2. Each scan line of the HDTV image contains 1716 sample intervals at the 54 MHz sample rate. Of these, 1616 samples constitute the active image and 100 constitute the horizontal sync word and ancilliary data. The 5:3 aspect ratio comes from the 1616/970=1.66, where 970 is the number of active lines out of the 1050/line frame. The 1616 samples comprise 1328 samples in a center portion 27 and 144 samples on each side of the active image. The 1328 samples in the center portion will be compressed to 1296 samples for the 1.33 aspect ratio of a standard NTSC raster. The outer 144 samples will be over-scanned on the standard receiver. It should be noted that the operation of the compatible system will be such that the center portion of the image will appear slightly compressed (i.e., 2½%) on the standard receiver and slightly expanded (i.e., 2½%) on the HDTV display thus enhancing the aspect ratio efficiency. The outer 144 samples are compressed nonlinearly (with interpolation) into 72 samples with a compression factor that ramps linearly from 2½ to a factor of about 3:1 at the extreme edges. Details of the aspect ratio compression block will be provided with respect to FIG. 8. The $1296+72+72=1440$ samples which fit precisely into the space of the 720 active samples of the standard definition world studio standard. A digitized equivalent to the normal analog sync and blanking interval can be made to fill the remaining 276 samples of the total line.

After aspect ratio compression in block 15, the samples of a first line are loaded into line store 17. Zigzag selector 19 selects samples from alternate lines—one sample from line store 17 followed by a sample directly from compressor 15 in manner illustrated in FIG. 3. FIG. 3a illustrates a television raster or image designated as 300. Five scan lines n, n+1, ... n+4 arbitrarily chosen from among the 1050 scan lines making up the raster are shown. Each scan line is made up of a large number of picture elements, or pixels, the size of which is determined by the resolution capability of the television system. The pixels of line n are designated $a_{11}$, $a_{12}$, $a_{13}$, $a_{14}$, ... and of n+1, $b_{11}$, $b_{12}$, $b_{13}$, $b_{14}$, ... In an interlaced television system, lines n, n+2, n+4, ... are laid down sequentially during one television field and, therefore, are separated by a sufficient distance to accommodate the interlaced lines of a second field n+1, n+3, ... forming a television frame. In FIG. 3b the region about an arbitrarily chosen standard definition pixel 301 has been expanded as an aid to understanding the invention. Those skilled in the art will understand that the square shape of the pixels is only illustrative. Because of the high resolution of the HDTV camera, the pixels are smaller so that four pixels illustrated as $a_{11}$, $a_{12}$, $b_{11}$ and $b_{12}$ fit within the same space occupied by a single pixel 301 in a standef (standard definition) scan. The effect of line store 17 and zigzag selector 19 is to produce a wobble scan across the subraster lines n, n+1, .... Each successive scan of the line in a 1050-line system explores across subraster lines, e.g., n, n+1 in a sinuous pattern illustrated in FIGS. 3c and 3d. FIGS. 3c and 3d represent frames 1 and 2, respectively, of a color frame. Raster lines m and m+2 of FIG. 3c are scanned in a first field of frame 1 and raster line m+1 in a second field of frame 1. Likewise in FIG. 3d raster lines m and m+2 are scanned in a first field of frame 2 and m+1 in a second field of frame 2. Each successive scan of the line explores one of two different sets of sub-pixels which are the pixels of a 1050-line high-definition system. Zigzag selector 19 causes exploration of the pixels including, in order, pixels $a_{11}$, $b_{12}$, $a_{13}$, $b_{14}$, $a_{15}$, $b_{16}$ during the scan of the m line. After the end of the scanning of the m line, pixels $a_{31}$, $b_{32}$, $a_{33}$, $b_{34}$, $a_{35}$, $b_{36}$ of the m+2 line are explored in a sinuous path. In the next field pixels $a_{21}$, $b_{22}$, $a_{23}$, $b_{24}$, of the m+1 line are explored. During the first field of the next following frame (shown in FIG. 3d), pixels $b_{11}$, $a_{12}$, $b_{13}$, $a_{14}$, $b_{15}$, $a_{16}$ ... of line m are explored and then corresponding pixels of line m+2, $b_{31}$, $a_{32}$, $b_{33}$, $a_{34}$, $b_{35}$, $a_{36}$. It will be noted that the second set of pixels being explored during the second frame constitute a completely different set of pixels of the 1050-line high-defintion raster. Since the interlacing of the pixels of raster lines m and m+2 takes place on successive vertical scans, it follows that the 1050-line scanning pattern of the raster must pass through two complete frames before every sub-pixel is explored.

Thus the compatible HDTV system, branch 11, provides the image in alternate samples from pairs of lines interlaced with pairs of lines in a manner reminiscent of Blumlein's synchronous spot-wobble concept of 1937. For further references to spot wobble, reference may be made to U.S. patent application Ser. No. 352,001 filed on Feb. 24, 1982, in the name of R. N. Hurst and Ser. No. 424,232 filed on Sept. 27, 1982, in the name of K. H. Powers. Since only half of the HDTV samples are clocked out in each field, the base bandwidth of the analog signal will be 11 MHz, and two complete frames will be required to trace out a complete image. Thus, this system exhibits full definition in stationary areas of the image whereas objects in motion will exhibit reduced resolution.

The advantage of the zigzag scan is that the low pass (i.e., 4.2 MHz) filter of a standard definition receiver will filter the image spatially in both dimensions simultaneously. Thus there should be no aliasing effects from the sub-Nyquist sampling and there should be negligible inter-element flicker from the two frame sequence. It is envisioned that the HDTV receiver will contain a frame store to be loaded in the interlacing zigzag sequence but scanned out linearly and progressively for display at a $4f_H$ rate thus eliminating any aliasing or element flicker. Such a receiver is described with respect to FIG. 9.

For full compatability, the transmitted HDTV signal must convey the color information on a 3.58 MHz subcarrier. Referring to FIG. 4, the digital component HDTV signal (zigzag scan) is rematrixed to Y, I and Q in matrix 401. The I and Q signals are low-pass filtered in filter 403 and digitally converted to a 3.58 MHz modulated subcarrier by multiplication with sine and cosine coefficients from ROM 405 in subcarrier modulator block 407. The luminance signal from matrix 401 is combined with the modulated I and Q in adder 411. The combined signal is then digital-to-analog converted in block 409 which provides an analog compatible HDTV signal having an 11 MHz bandwidth. This buried subcarrier is interleaved in frequency with the luminance and can be separated in a normal receiver by a line comb. The HDTV receiver would use an adaptive frame comb decoder for near perfect color separation.

The output from digital-to-analog converter 409 may be transmitted in two channels as described in the aforementioned Powers application. In this two channel compatible HDTV television system the Δ high-definition component is carried in an extension of the luminance bandwidth to 11 MHz. This signal could be transmitted on two contiguous cable channels or through a standard satellite transponder. Inadequate bandwidth in the channel will cause the resolution to degrade simultaneously horizontally and vertically.

Referring to FIGS. 5 through 8, details of the aspect ratio compressor 15 of FIG. 1 will be provided. FIGS. 5a and 5b illustrate timing details of the arrangement of FIG. 2 for the aspect ratio compression. The input samples of FIG. 5a include the first 100 samples which are set aside for the horizontal blanking and ancilliary data. Samples 100 to 244 include 144 samples which constitute the left edge of the active image of a wide-angle display. The next 1328 samples, which goes from sample 244 to sample 1572, includes the center portion of the active image; the 144 samples on the right side extending from sample 1572 to sample 1716 includes the right edge of the active image of the wide-angle display. FIG. 5b illustrates the output samples that will be derived from the aspect ratio compressor in accordance with the invention. It should be noted that the output samples are displaced in time from the input samples to provide enough buffer storage to effect the interpolation prior to clocking the samples out of the aspect ratio compressor into the line store. There is a danger that the samples coming in to be interpolated may over run the samples going out so enough buffer must be provided to ensure continuous data in. In FIG. 5b the 144 samples between samples 100 and 244 of FIG. 5a are compressed to the first 72 samples of the 5b line, that is, samples 0 to 72. The next set of samples start at sample 72 and go to sample 1368 and comprise 1296 samples which are a compression of the 1328 center portion samples of the input samples. This provides a compression of approximately 2½%. The next 72 samples between sample 1368 and 1440 on the output sample line are derived from the input samples from 1572 to 1716. The last 276 samples from sample 1440 to sample 1716 of the output samples are used for the horizontal blanking and other ancilliary data. FIG. 5c shows how the compression occurs over the interval of the input samples. The left edge, 144 samples, are compressed nonlinearly into 72 samples with a compression factor that ramps linearly from approximately 3 to approximately unity (2½%). The center interval is compressed by a uniform factor of 2½% and the right edge is compressed nonlinearly from a factor of approximately unity (2½%) to a factor of about 3 at the extreme edge.

Referring to FIG. 6, the details of the nonlinear compression of the outer 144 samples on each side of the active image are illustrated. The details will be derived for the right-hand edge compression. FIG. 6a illustrates the compression of the 144 input samples to the 72 output samples. Assuming an output sample n, the input sample occurs at a position $n+x_n$. FIG. 6b is a graphical representation of a parabolic and a cubic approximation for $x_n$ in accordance with FIG. 6a. The illustrative embodiments of the present invention will be described with respect to the parabolic curve as shown in FIG. 6b. Accordingly when n=0, $n+x_n=0$, when n=36, $n+x_n=36+18$ or 54, and when n=72, $n+x_n=144$. The parabolic expression for $x_n$ generally provides the nonlinear ramp compression as described with respect to FIG. 5c. The cubic expression for $x_n$ would provide a parabolic compression factor rather than a ramp.

Referring to FIG. 6c, a technique for interpolating between samples will be described. Assume that the desired $n+x_n$ value falls between a first input sample q and a second input sample q+1. The sample interval between q and q+1 is divided into 16 gradations. The interpolated value of pixel $n+x_n$ will be the q pixel value plus or minus some fraction n'/16 of the difference between the values of pixels q and q+1, wherein n' is chosen from a value between 1 and 16. Referring to FIG. 7, a table of the n, $x_n$, $n+x_n$ and n' values is provided. In accordance with this table the n' numbers have been derived for n from 0 to 72. In general, this n' number has been selected by choosing the fraction of 16 nearest to the $n+x_n$ value. For example, for n=2, $n+x_n=2.055555$. The nearest fraction of 16 to 0.055555 is 1/16. As another example take n=20; then $n+x_n$ would equal 25.5555 and the 0.5555 is closer to 9/16 than either 8/16 or 10/16. These n' values may be used in accordance with a digital scheme for interpolating from 144 input samples to 72 output samples, as described in U.S. patent application Ser. No. 230,384 filed on Feb. 2, 1981, in the name of K. H. Powers (now abandoned), continuation-in-part application Ser. No. 262,619 filed on May 11, 1981, (also now abandoned), continuation-application Ser. No. 411,907, filed on Aug. 26, 1982 (now U.S. Pat. No. 4,438,452), with division applications Ser. No. 411,905 (now U.S. Pat. No. 4,550,335) and Ser. No. 411,906 (now U.S. Pat. No. 4,455,611).

Figure 8:
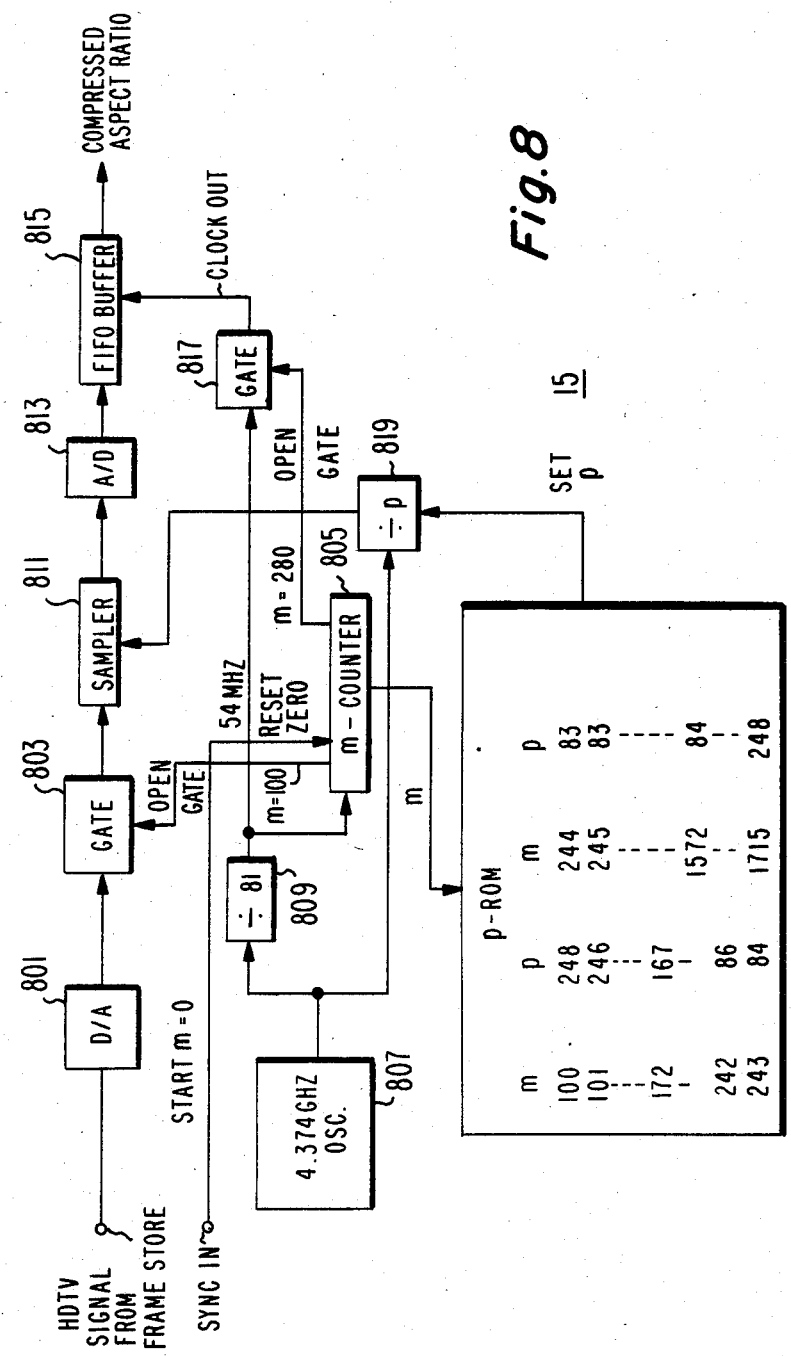
FIG. 8 shows details of a sampling embodiment for the aspect ratio compressor of FIG. 1 in accordance with the principles of the present invention.

Referring to FIG. 8, an arrangement is shown for effecting sample compression by the use of a variable clock rate sampling of the analog video signal. The apparatus of FIG. 8 provides both a nonlinear compression at the edges and a linear compression in the center of the active scan. The interpolation during compression according to FIG. 8 is performed in an analog manner. The HDTV signal from frame store 9 is digital-to-analog converted in block 801. The analog signals are delivered to gate 803 which is opened and closed in response to counter 805. A synchronizing pulse (which could be a horizontal sync pulse) starts counter 805 which counts from 0 to 1715. Counter 805 counts in response to clock pulses from oscillator 807 which provides a 4.374 GHz signal. The 4.374 GHz is divided by 81 in divider 809 to provide the 54 MHz clock pulses (four times the world standard) to counter 805 and gate 817. When counter 805 reaches a count of 100 signifying the end of horizontal blanking, gate 803 is enabled to pass the analog signals from digital-to-analog converter 801 to sampler 811 and analog-to-digital converter 813. The samples, which are digital in nature, are stored in FIFO buffer 815 and are clocked out at the 54 MHz rate in response to the signal from gate 817. Sampler 811 is responsive to the clock pulses from (programmable divider) 819 whose divide-by value p is changed in accordance with the count provided to read-only-memory (ROM) 821. The p-values provided to divider 819 by ROM 821 in response to the current count m cause divider 819 to divide the pulses provided by oscillator 807 to effect a sampling in accordance with the compression chosen.

The operation of the aspect ratio compressor 15 will now be described with reference to FIG. 8. The samples in the center of the picture, i.e., 1328 input samples and 1296 output samples, are evenly divisible by 16 to provide 81 output samples for 83 input samples. Thus in the center region the 4.374 GHz clock 807 will be divided by 83 such that the input analog signal is sampled 1296 times during the center portion of the raster. Since $83/81 = 1.025$, this provides the 2½% compression of the center portion. The edges of the raster, on the other hand, must be dealt with differently. At the extreme edges for example where the compression factor is 3:1 the p-value is 248 to provide the desired compression. On the other hand, at the transition between the outside left edge and center for the last sample on the outside edge the p factor is 84. It should be noted that on the righthand side the p-values go from the smaller value of 84 at the transition point to the larger values of 248. Another nonlinear edge compression for a wide-angle screen is described in U.S. patent application Ser. No. 350,088 filed on Feb. 18, 1982, in the name of R. A. Dischert et al. (now U.S. Pat. No. 4,551,754). Referring to FIG. 7, some of the p-values have been calculated for the various n values. The missing p-values may be calculated by taking the difference between successive $n + x_n$ values, multiplying that difference by 83 and rounding to the nearest whole integer.

Figure 9:
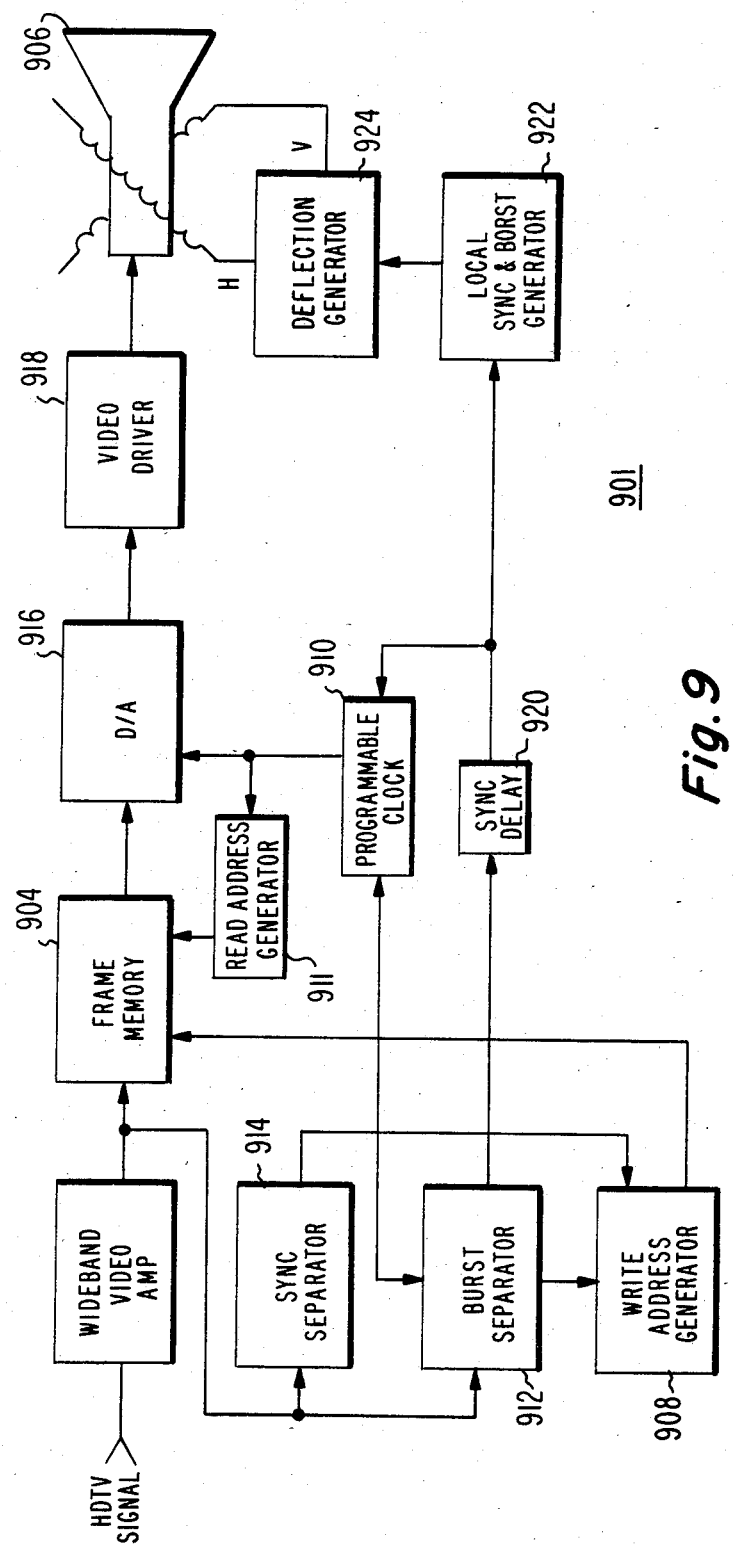
FIG. 9 is a block diagram of a progressively scanned wide angle television receiver.

Referring to FIG. 9 a wide-angle, high-resolution television receiver is shown. To assure that in a high-resolution display, the quality is not marred by scan structure artifacts compounded by spot wobble, a line-scan television receiver 901 is described. In the receiver of FIG. 9 a progressively scanned horizontal line raster 906 is provided wherein a picture is displayed having full resolution in every display field. In this system each pixel transmitted in the wobble pattern is accumulated in its proper position in random access frame memory 904 until a complete high-definition television frame (i.e., 4 NTSC fields) is ready for progressive display. Frame memory 904 is a 1,050-line memory. Associated with frame memory 904 are write address generator 908 and programmable clock 910. This arrangement eliminates subpixel flicker by storing a high-definition frame of 1,050 lines. The information is stored in its proper location at the rate of the incoming signal by controlling write address generator 908 with the aid of a signal derived from burst separator 912 and sync separator 914. On the read side, programmable clock 910 is synchronized by signals from separator 914 and provides clock pulses at times complementary to the compression provided by the encoder of FIG. 8. In accordance with the present invention the programmable clock provides a stream of clock pulses the rate of which varies with the pixel being addressed via read address generator 911 in frame memory 904. For example, at the extreme right edge of a raster the programmable clock clocks the information out of the frame memory at a slow rate. As the pixel information approaches the center the clock speeds up to a constant rate in the center section where the active display in the standard definition raster is located. In the center section the expansion factor is 2½%. The clock then slows down at the left-hand edge of the raster. In this arrangement the programmable clock controls the frame memory to write the information to digital-to-analog converter 916 such that the compression effected at the encoder is expanded in a complementary fashion at the receiver. D/A converter 916 converts the digital signals from frame memory 904 to analog information at the variable clock rate and the analog information is delivered to video driver 918 for display on raster 906. The programmable clock is controlled by the burst separator 912 which is delayed by sync delay 920. The reading rate is, in general, independent of the incoming signal rate and can provide the advantage of progressive scan, but normally the reading rate is synchronized with the writing rate through sync delay 920. Illustratively, the delay is such that at least three fields are written in frame memory 904 to allow the first two lines of video to be filled before readout is started. Local sync generator 922 controls deflection generator 924 which in turn controls the vertical and horizontal deflection of an electron beam on raster 906. A variable-time-constant low-pass filter controlled by the rate of programmable clock 910 or a sample-and-hold circuit followed by a low-pass filter may be coupled between D/A 916 and driver 918 for smoothing clock noise in the edge regions with a relatively long time constant while allowing high definition in the raster center with a short time constant.

One problem with 525-lines per frame, 30 frames per second (525/30) scanning systems such as the NTSC system and other interlaced systems such as PAL is that artifacts are derived from the line-scan process itself.

Figure 10:
FIG. 10 illustrates a scanned image containing one field of information and showing the "black raster"

The artifacts arise mainly due to the interlace process in the standards. Interlace is a technique for "shuttering" equivalent to the shuttering process in motion-picture technology. The purpose of interlace is to increase the flicker rate of the picture being displayed to reduce the perceptibility of the periodic appearance and disappearance (flicker) of the picture. A high flicker rate is desirable because it gives the appearance of a continuously-existing picture. In the NTSC system, 525 lines are scanned in 1/30 of a second, giving a 30 Hz sample rate. The interlaced process divides the 525-line picture or frame into two successive 262½-line fields. 262½ lines of a first field are scanned in 1/60th of a second followed by scanning of an additional 262½ lines of a second field, with the second field lines occupying the spaces between the lines of the first field. In effect, the raster scanned by either field alone may be considered to create a white or colored image interleaved with an unmodulated black raster. This is illustrated by the black raster shown in FIG. 10. During the next following field, the black lines of the black raster of the previous field are overwritten by the white lines of the following field, but rather than eliminating the visibility of the black raster the subjective effect or illusion is to create an apparent vertical drift of the black raster. The moving black raster is easily seen when viewing a wide-screen display at close range.

Figure 11:
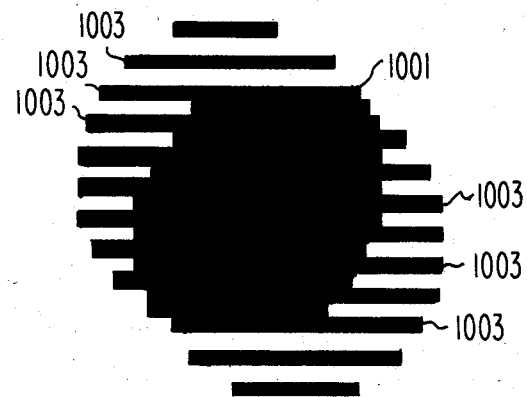
FIG. 11 illustrates a full frame image of a moving circular object displayed by interlaced line scanning showing a serrated-edge effect due to motion.

Another disturbing artifact caused by interlaced scanning results from the visibility of the scanning lines on the edges of moving objects. This results from a difference in position of the moving object from field-to-field. The edges of objects in motion have half the nominal vertical resolution and take on a ragged or serrated appearance broken by the clearly visible black scan lines. FIG. 11 illustrates the effect of a black circular object 1001 in motion on a white background with the serrated edges 1003 clearly visible. The serrated edge effect on moving objects may be eliminated. If the HDTV camera of FIG. 1 were shuttered at the field rate and the HDTV frame store were to store a complete 1050-line frame during a HDTV field period the serrated edge effect could be eliminated by gating out alternate HDTV fields to the filter 21. Thus each output HDTV frame of two 525-line fields or one 1050-line frame sequence could be selected from an identical image to eliminate the serrated-edge effect on moving objects characteristic of interlaced scanning.

Figure 12:
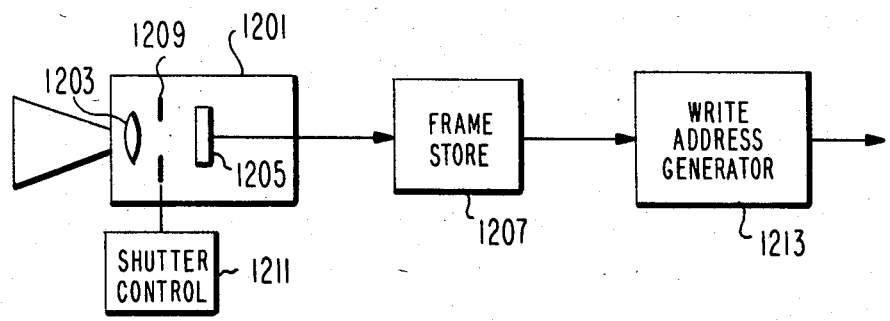
FIG. 12 is an arrangement for the camera of a high definition system wherein the camera provides a signal output of two fields from the same scene.

Referring to FIG. 12, details of a camera arrangement for eliminating the serrated edge effect on moving objects are provided. Camera 1201 includes lens or optical processor 1203 which focuses light from a scene (not shown) onto the photosensitive surface of solid state imager 1205 (illustrated as a monochrome imager). Imager 1205 is coupled through various signal processing circuitry such as gamma correction (not shown) to frame store 1207. A shutter 1209 is provided between lens 1203 and imager 1205. Ordinarily, imager 1205 integrates for a time substantially equal to one field, so there are two integration periods followed by two pull-down intervals during each frame interval. During a pull-down interval shutter 1209 is closed so no light reaches imager 1205. In accordance with the embodiments of FIG. 12, shutter control 1211 controls the operation of shutter 1209 such that there is only one integration period during a frame interval. For this embodiment imager 1205 provides a 525-line frame to frame store 1207 during the pull-down interval. Thus frame store 1207 stores a complete 525-line image taken from the same scene. To effect a 262½-line interlaced output compatible with standef receivers write address generator 1213 selects alternate lines of the 525-line frame from frame store 1207 for each field sequence. That is, write address generator selects odd lines, i.e., 1, 3, 5, etc. for the first field of a two field sequence and even lines, i.e., 2, 4, 6, etc. for the second field to produce a two field sequence from the same scene thus eliminating the serrated edge effect on moving objects.

Figure 13A:
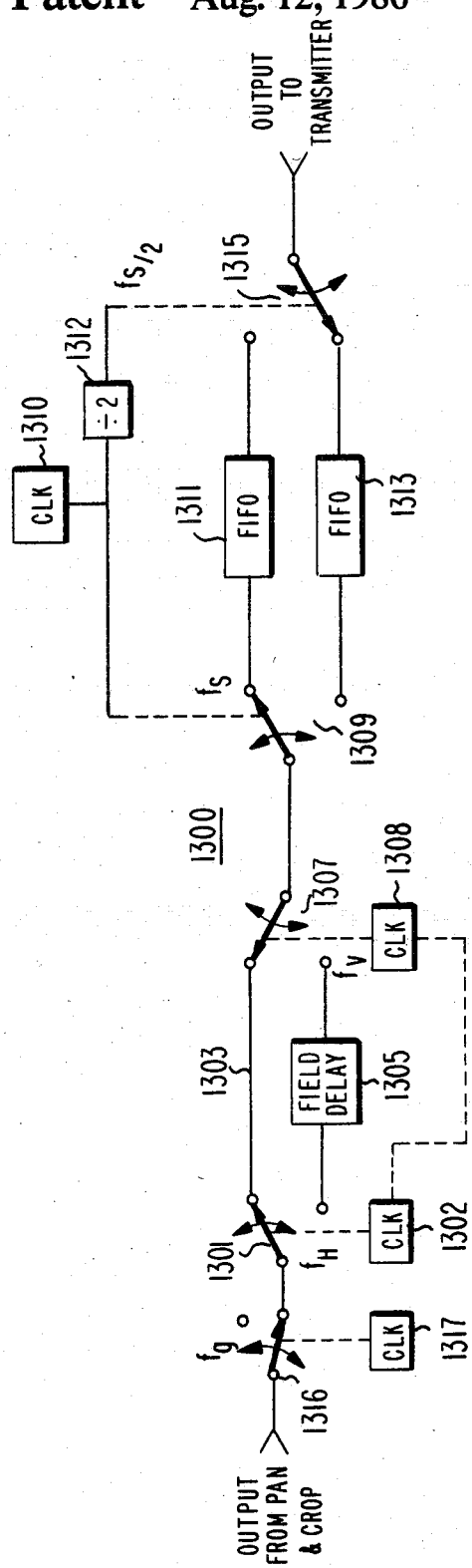
FIG. 13a is a modification of the block diagram of FIG. 1 showing an arrangement for eliminating serrated edge effects on the edges of moving objects.
Figure 13B:
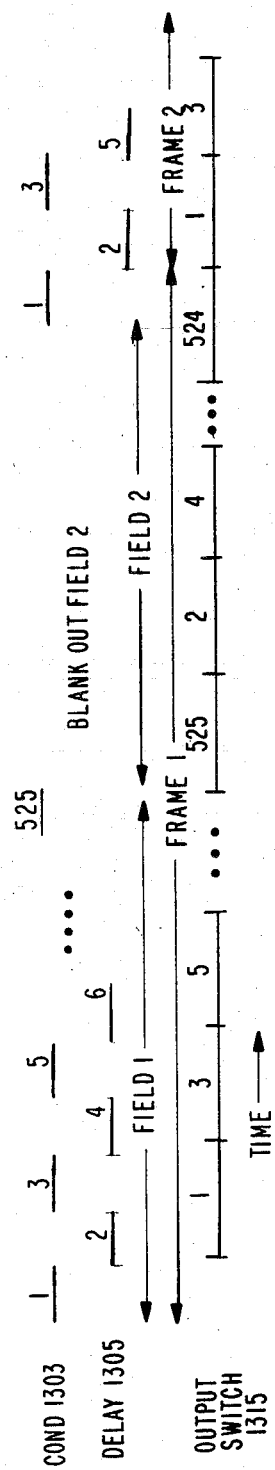

Referring to FIG. 13, another arrangement for eliminating the serrated edge effects on moving objects is described. This is done by replacing the alternate sample and line subsample block 25 of FIG. 1 with apparatus 1300 of FIG. 13. By gating out alternate HDTV fields, each output field is selected from an identical image to eliminate the serrated edge effect on moving objects characteristic of interlaced scanning. Referring to FIG. 13a the output from pan and crop (block 23, FIG. 1) is switched by toggle switch or gate 1316 at a subsample rate $f_g$ (illustratively, $f_g$ may equal 27 MHz) to gate alternate samples. Gate 1316 is controlled by clock 1317. The alternate samples from gate 1316 are switched by gate 1301 at a horizontal line rate $f_H$ of camera 1 of FIG. 1. Clock 1302 controls switch 1301. Thus alternate lines from a field are switched by gate 1301 between conductor 1303 and delay 1305. FIG. 13b shows a timing diagram depicting the progression of horizontal lines of signals passing through the elements of FIG. 13a. Switch 1307 operated by clock 1308 at the vertical rate of camera 1 passes odd lines with gaps from conductor 1303 and even lines with gaps from field delay 1305 to switch 1309. A coupling between clocks 1302 and 1308 disables clock 1302 for alternate fields. Switch 1309 switches alternate samples to FIFO buffers 1311 and 1313. The samples stored in FIFO buffers 1311 and 1313 are then passed through switch 1315 at half of the rate of switch 1313 to stretch the samples across the time period of a standef horizontal line to thereby eliminate the gaps created by switch 1316. The output of switch 1315 is a continuous signal shown by the timing diagram of FIG. 13b. Switch 1309 is controlled by clock 1310 which switches samples at a sample rate $f_s$. Switch 1315 is also controlled by clock 1310 but it switches at one half of the rate of switch 1309 $f_s/2$ since the clock rate is divided by two in divider 1312. Illustratively sample rate $f_s$ could be 27 MHz. Buffers 1311 and 1313 provide one line of storage to effect the stretching of the signal across the gaps. It should be noted that eliminating the serrated edge effect as described herein may cause other disturbing artifacts such as temporal aliasing.

Other embodiments of this invention will be apparent to those skilled in the art. In particular, the aspect ratio compressor 15 which was described in conjunction with an analog interpolation version of FIG. 8 could be implemented by digital interpolation techniques.

What is claimed is:

1. A wide-angle television system compatible with a standard definition television system having a relatively narrow-angle field of view comprising:

generating means for generating video samples during an active line portion of a wide-angle television horizontal line, said video samples representing first and second portions of a scene, said first portion being representative of the active display portion of a standard definition television receiver and said second portion being representative of a part of said scene exclusive of said active display portion of said standard definition receiver;

compression means for time compressing said second portion of said scene such that the number of said video samples within said second portion are reduced by approximately a factor of 2; and setting means for setting the total number of samples within said active line portion of said wide-angle television horizontal line to a value of 1440 samples which samples are compatible with the world standard studio-equipment sample rate of 13.5 MHz.

2. A system according to claim 1 wherein said video samples are digitally encoded.

3. A wide-angle television system compatible with a standard definition television system having a relatively narrow-angle field of view comprising:

a source of television signals representative of a wide-angle view of an image of a scene, said signals being quantized at a first given rate to provide video samples representative of said wide-angle scene; said video samples including a first and second pluralities of samples representative of first and second portions of the active scan of said wide-angle scene and a third plurality of samples representative of a third portion of said active scan spatially positioned between said first and second portions; and compression means for time compressing said samples, said time compression being effected such that the third plurality of samples are compressed linearly so that the compressed third plurality of samples fit into the active display portion of a standard definition television receiver and the first and second pluralities are nonlinearly compressed to provide a wide-angle high-definition television system.

4. A system according to claim 3 wherein said quantization is amplitude quantization whereby said video samples are digitally encoded.

5. The apparatus according to claim 3 wherein said first and second plurality samples are compressed from a rate of approximately three-to-one to a rate of approximately one-to-one to effect said non-linear compression.

6. The apparatus according to claim 5 wherein the total number of compressed samples for said first, second and third samples is equal to 1440 samples per active line which samples are compatible with the world standard studio-equipment sample rate of 13.5 MHz.

7. A wide-angle television system compatible with a standard definition television system having a relatively narrow-angle field of view comprising:

a camera for scanning a wide-angle view of an image of a scene to generate an analog video signal representative of first and second fields of interlaced lines;

converter means for converting said analog video signal generated by said camera into amplitude quantized digital samples; said digital samples representing first and second portion of said image, said first portion being representative of the active display portion of a standard definition television receiver and said second portion being representative of a part of said image exclusive of said active display portion of said standard definition receiver;

first storing means for storing said amplitude quantized digital samples;

compression means for compressing the samples stored in said storing means such that the number of said samples within said first portion are reduced linearly and the number of said samples within said second portion are reduced nonlinearly by a factor of approximately 2;

second storing means for storing the samples of one horizontal line of the wide-angle samples; and selector means for selecting alternate samples from adjacent horizontal lines of samples to effect a zigzag scanning pattern to said samples.

8. A wide-angle television receiver for displaying wide-angle television signals comprising:

receiving means for receiving signals representing first and second portions of a scene, said first portion being representative of the active display portion of a standard definition television receiver and said second portion being representative of a part of said scene exclusive of said active display portion of said standard definition receiver;

expansion means for linearly time expanding the signals representing said first portion of said scene; and display means for displaying said time expanded signals representing said first portion of said scene in the center portion of a raster of said wide-angle television receiver;

wherein said expansion means non-linearly expands the signals representing said second portion of said scene to provide signals representing the edge portions of said wide-angle raster and wherein said display means displays said non-linearly expanded signals at the edge portions of said raster of said wide-angle receiver to provide a wide-angle reproduction of said scene.

* * * * *